United States Patent [19]

Alten

[11] Patent Number: 5,174,084
[45] Date of Patent: Dec. 29, 1992

[54] DEFORMABLE SEALING DEVICE FOR A GAP BETWEEN A WALL OPENING OF A BUILDING WALL AND A BACK WALL OF A VEHICLE

[76] Inventor: Kurt Alten, Ringstr. 14, D-3015 Wennigsen, Fed. Rep. of Germany

[21] Appl. No.: 766,558

[22] Filed: Sep. 25, 1991

[30] Foreign Application Priority Data

Sep. 25, 1990 [DE] Fed. Rep. of Germany ....... 4030255

[51] Int. Cl.⁵ .................... E04H 14/00; E07D 1/00
[52] U.S. Cl. .................. 52/173 DS; 14/71.5
[58] Field of Search ............ 52/2, 173 DS; 49/123, 49/303, 316, 477, 483; 14/71.5

[56] References Cited

U.S. PATENT DOCUMENTS

| | | | |
|---|---|---|---|
| 3,935,684 | 2/1976 | Frommelt | 52/173 DS |
| 4,062,157 | 12/1977 | Potthoff | 52/173 DS |
| 4,213,279 | 7/1980 | Layne | 52/173 DS |
| 4,494,341 | 1/1985 | Schwab | 52/173 DS |
| 4,516,366 | 5/1985 | Alten | 52/173 DS |

FOREIGN PATENT DOCUMENTS 3130654 8/1981 Fed. Rep. of Germany .
8300412 1/1983 Fed. Rep. of Germany .
3631591 9/1986 Fed. Rep. of Germany .

OTHER PUBLICATIONS

Textbook of Polymer Science, Fred W. Billmeyer, Jun. 29, 1992, pp. 473-474.

Primary Examiner—David A. Scherbel
Assistant Examiner—Beth A. Aubrey
Attorney, Agent, or Firm—Robert W. Becker & Associates

[57] ABSTRACT

A deformable sealing device for a gap between a wall opening of a building wall and a back wall of a vehicle is provided. The sealing device comprises a flappy deformable skirt having an upper transverse portion and two vertical strips extending parallel to the vertical sides of the wall opening. The vertical strips are connected to a front face of a respective elastic deformable support body that has a quadrilateral cross-sectional shape and a flexible pull-resistant cover. The support body is connected to the building wall. The support body comprises a respective block of a soft, elastically deformable foamed material which exerts a pre-stress onto the face portion of the cover at the front face of the support body where the vertical strips are attached.

18 Claims, 2 Drawing Sheets

DEFORMABLE SEALING DEVICE FOR A GAP BETWEEN A WALL OPENING OF A BUILDING WALL AND A BACK WALL OF A VEHICLE

BACKGROUND OF THE INVENTION

The present invention relates to a deformable sealing device for a gap between a wall opening of a building wall and a back wall of a vehicle that is backed up against the building, whereby the sealing device comprises a flappy deformable skirt having an upper transverse portion and two vertical strips that are parallel to vertical sides of the wall opening. The vertical strips are connected to a front face of respective elastic deformable support bodies having a square or rectangular cross-sectional shape and a flexible pull-resistant support body cover. These support bodies are connected to the building wall.

In known sealing devices of the aforementioned kind, as, for example, described in DE-PS 36 31 591, the core of the support bodies comprises horizontally arranged spiral springs which are provided at their front end with a board-like reinforcement which support the portion of the support body that forms the front face of the cover to which the vertical strips are attached. It is obvious that this board-like reinforcement reduces the deformability of the sealing device. Thus, the adaptability of such sealing devices to various contours of vehicles is limited.

It is therefore an object of the present invention to improve the sealing devices of the aforementioned kind such that the deformability of the sealing device in the area of the front ends of the support bodies is considerably improved so that the vertical strips of the skirt accordingly have an improved adaptability to respective vehicle contours.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
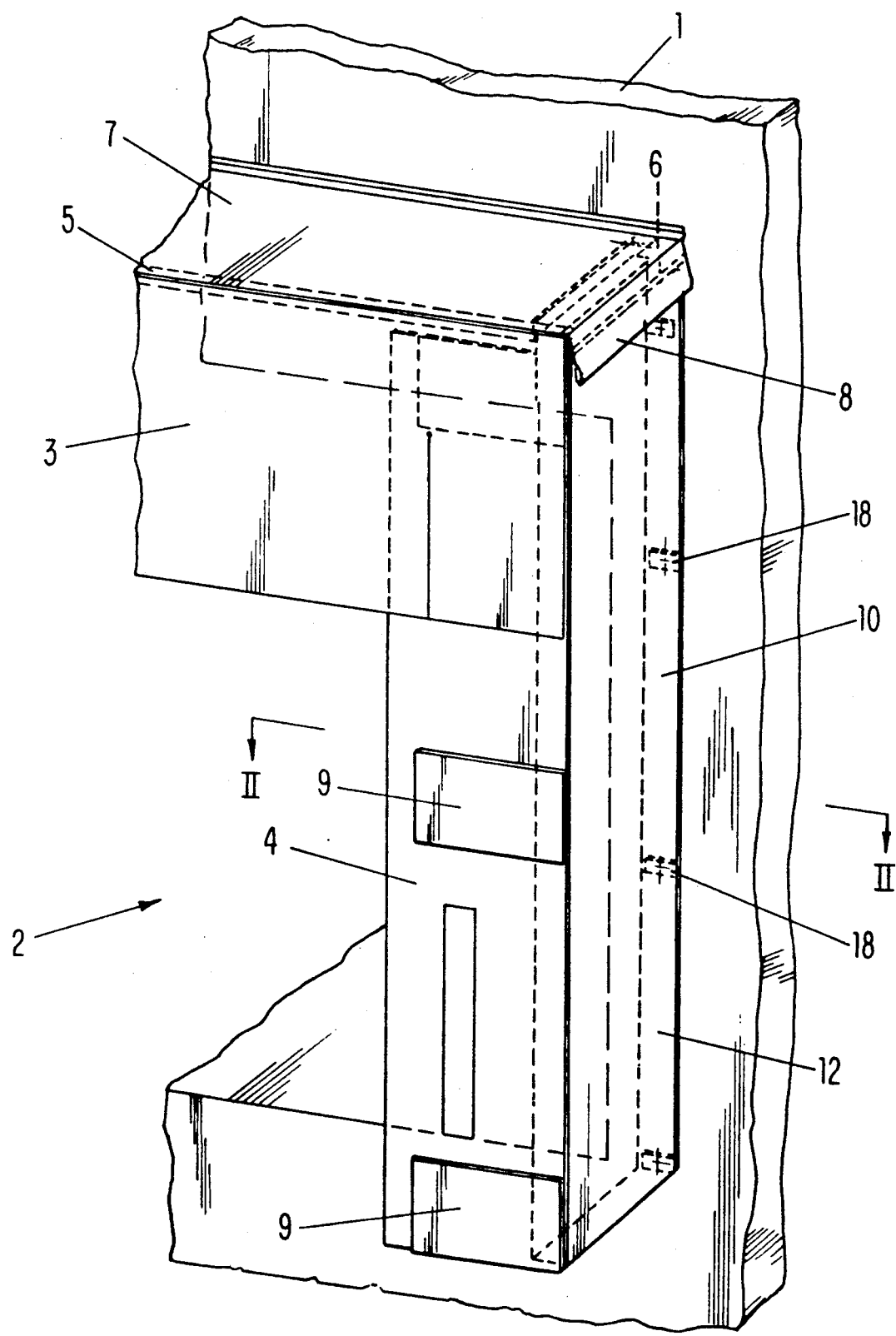
FIG. 1 shows the right half of the sealing device for a gate of a warehouse.

The sealing device of the present invention is primarily characterized by the support bodies comprising a respective block of a soft, elastically deformable foamed material which exerts a pre-stress onto a face portion of the cover at the front faces of the support bodies where the vertical strips are connected.

Such a pre-stress of the support body core, i.e., the respective blocks of a soft, elastically deformable foamed material, results in an improved stiffness of the support body so that, without further reinforcements, the support body can carry or support the respective vertical strips which are comprised of fabric or foil or the like. Despite its stiffness the support body is still sufficiently deformable and adaptable to various contours of vehicles.

Such a pre-stress allows for the fastening of the free ends of the support body cover that are facing the building wall by inserting respective reinforcements of the free ends into recesses provided at a side of the block that is opposite the front face, i.e., is facing the building wall. The elastic pre-stress of the foamed material favors the fastening of the free edges. The fastening may be arranged such that the free edges are easily releasable.

The pre-stress within the support body core has the advantage of an improved deformability of the vertical strips and of the support body itself and furthermore provides an improved releasable fastening of the free edges of the support body cover. The pre-stress present in the core of the support body, i.e. within the blocks of foamed material, may be selected such that, on the one hand, the mentioned form locking within the area of the free edges of the support body cover is ensured and, on the other hand, the stiffness of the support body is not increased to an extent where a reduction of the deformability of the sealing device would result.

It is furthermore important that the blocks of the support body rests loosely at the inner side of the support body cover which supports the vertical strips of the skirt. Only a frictional connection due to the pre-stress is suggested due to the pre-stress in order to avoid negative effects on the deformability.

It is expedient that the face portion of the cover is directly contacting the block made of foamed material. Preferably the deformation of the block that generates the pre-stress is approximately 1/50 to 3/50 of the expansion of the block in an undeformed state.

Preferably the support body cover is provided with fastening means at its free ends, whereby the fastening means are held in their position by the aforementioned pre-stress. The fastening means are preferably in the form of a reinforcement of the free ends that are inserted into a recess provided at a side of the block that is opposite the front face of the support body. The reinforcement may be in the form of a ledge that is adhesively connected to the free ends of the cover. The ledge is preferably positioned in the respective recess in a non-tiltable manner. To prevent the reinforcement from sliding out of the recess a safety means is provided at the recess.

In a further embodiment the block of this support body rests against a profiled support whereby the profiled support, at vertical edges of one side facing the vertical building wall portions, is provided with a respective groove into which a U-shaped portion of a respective fastening latch is inserted. The fastening latch is connected to a respective bracket that is attached to the building wall.

The profiled support, in a longitudinal direction thereof, is provided with at least one projection on the side facing the block, whereby the projection is in a form-locking connection with the block to prevent sliding of the block.

The free end faces of the block are provided with an elastically deformable protective coating which protects the foamed material against ozone or UV radiation.

In a preferred embodiment the transverse portion is supported at a transverse support which is supported at arms that extend from the building wall, whereby the length of the arms is adjustable against an elastic force.

Preferably, a surface of the block facing the vertical strips of the skirt is in a frictional connection with the respective inner side of the support body cover and an outer side of the support body cover that is facing the vertical strips is in an adhesive connection with the vertical strips.

The support bodies may have a square or a rectangular cross-sectional shape. The foamed material of the blocks may be plastic or rubber.

DESCRIPTION OF THE PREFERRED EMBODIMENTS

Figure 2:
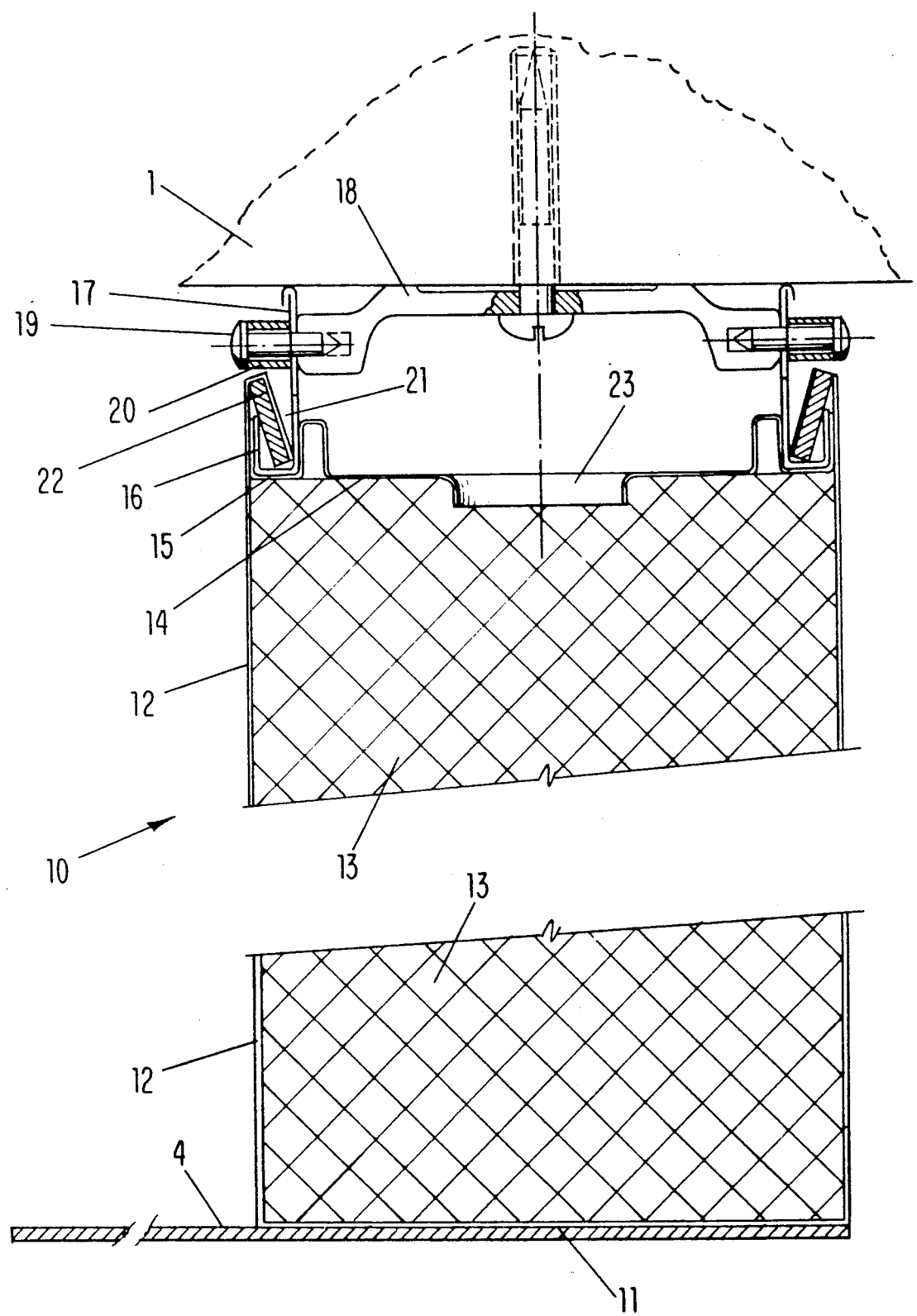
FIG. 2 shows a horizontal cross-sectional view along the lines II—II of FIG. 1.

The present invention will now be described in detail with the aid of several specific embodiments utilizing FIGS. 1 and 2.

The building wall 1 is provided with a wall opening 2 which is usually closable by a so-called sectional door or gate and which serves to provide access to the warehouse.

In order to seal the gap between the back wall of a backed-up vehicle and the edges of the wall opening 2 the inventive sealing device which will be described in detail in the following paragraphs is suggested.

At a distance from the building wall 1 a deformable skirt is provided which comprises an upper transverse portion 3 and two vertical strips 4 which are arranged essentially parallel to the vertical sides of the wall opening 2. The vertical strips 4 and the transverse portion 3 are comprised of flappy foil-like material which allows a deformation and adaptation to the respective back wall of various vehicles. Commonly, these portions consist of a fabric that is treated or coated with plastic or rubber.

The transverse portion 3 which is essentially suspended like a curtain is connected to a thin transverse support 5 with its upper end. The ends of the transverse support 5 are held by arms 6 that are connected to the building wall 1 at the edges of the sealing device. The space between the transverse support 5 and the building wall 1 is bridged by a top cover or tarpaulin 7 which is essentially water-proof.

The transverse support 5 together with the top cover 7 and two flaps 8, which are connected to the lateral ends of the top cover 7 and extend in a downward direction, are supported and fastened independently from the two vertical strips 4 and their respective support bodies. However, the length of the two arms 6 may be adjusted against the elastic force of, for example, a pressure spring or a telescopic arrangement in order to provide a sufficient resilience when the transverse portion 3 is excessively deformed by the back wall of a vehicle.

The two vertical strips 4, which may be provided with a flexible foil reinforcement 9 at the top, at the center and at the bottom, is supported at support bodies 10 that are arranged at both vertical sides of the wall opening 2 and have essentially a rectangular cross-section. The support bodies 10 are connected with their back to the building wall 1 and have attached to their front faces in an adhesive manner to the vertical strips 4.

The front face 11 of the support body 10 which serves as the fastening surface for the vertical strips 4 is formed by a foil-like cover 12 which is preferably made of a fabric that is coated with rubber or plastic. The cover 12 essentially encloses the block 13 that is made from a soft, elastically deformable foamed material, preferably plastic. The block 13 is essentially of a rectangular cross-sectional shape and extends over the length of the vertical strips 4. The back of the block 13 is supported at a profiled support 14 which is made from sheet steel. The profiled support 14, at vertical edges of the side facing the building wall, is provided with a respective groove 15 into which a U-shaped portion of a respective fastening latch 17 is inserted without play. The fastening latches 17 are connected to a respective bracket 18 that is attached to the building wall. These brackets 18 are distributed over the height of the wall opening. The fastening screws 19 with which the latches 17 are connected to the building wall 1 extend past the fastening latches 17 to the outer edge of the support body 10 due to respective spacer sleeves 20. In this manner, recesses 21 are provided at the back of the profiled supports 14 at either side of the support body 10.

The free ends of the cover 12 are reinforced by rectangular ledges 22 attached thereto which may be inserted into the recess 21 in a non-tiltable manner. In order to mount and fasten the blocks 13 to the building wall, the support body cover 12 is tightened by compressing the block 13 which is thus elastically deformed. After the free ends of the support body cover 12 with the respective ledges 22 have been inserted into the recesses 21 the support body cover 12 is in a fixed position and the block 13 is thus attached to the building wall 1. The elastic pre-stress of the block 13 provides a pull load within the support body cover 12. The fastening of the block 13 is thus ensured. The ledges 22 may not accidentally slide out of the respective recesses 21 because the fastening screws 19 are positioned in front of the opening of the recesses 21. The width of the recess 21, is as can be seen from the drawing, only slightly greater than the thickness of the ledge 22. Therefore, the ledge 22 may not tilt within the recess 21 which, of course, further requires a corresponding depth of the recess 21.

The pre-stress induced within the block 13 increases the stiffness and form stability of the block 13 such that its stiffness is sufficient to support the vertical strips 4. At the same time, the vertical strips 4 and the block 13 together with the support body cover 12 are sufficiently deformable when the vehicle that is backing up against the wall opening deforms the sealing device from the front or at an angle, also within the area of the support body 10. The areas at the front of the block 13 corresponding to the front face 11 of the support body 10 are also sufficiently deformable. The pre-stress within the block 13 may be comparatively small. For example, when the distance between the front face 11 and the profile support 14 is 500 mm, then the required compression of the block 13 by tightening the cover 12 should only be 10 to 30 mm, preferably only 15 mm. This pre-stress is sufficient to prevent the block 13 from sliding in a downward direction by generating an elastic form-locking connection due to a projection 23 at the profiled support 14.

The upper and lower ends, i.e., the end faces of the block 13, that is in the area of the ends of the vertical strips 4, are essentially exposed to the environment free. In order to protect these end faces they are provided with an elastically deformable protective coating, for example, made of rubber or plastic. These coatings protect against the effects of UV radiation, ozone, and other detrimental environmental influences.

With the exception of the form-locking connections at the projection 23 the block 13 and the cover 12 are only fictionally connected within all other areas so that an excellent deformability is ensured.

The present invention is, of course, in no way restricted to the specific disclosure of the specification and drawings, but also encompasses any modifications within the scope of the appended claims.

What I claim is:

1. A deformable sealing device for a gap between a wall opening with vertical sides of a building wall and a back wall of a vehicle, said sealing device comprising a flappy deformable skirt, said deformable skirt comprising an upper transverse portion and two vertical strips extending parallel to said vertical sides of the wall opening, said sealing device further comprising respective elastic, deformable support bodies, having a quadrilateral cross-sectional shape with a front face and a flexible pull-resistant support body cover, said support bodies being connected to the building wall and said vertical strips being attached to said front faces; wherein the improvement comprises:

said support bodies comprising a respective block of a soft, elastically deformable foamed material which exerts a pre-stress onto a face portion of said support body cover at said front faces of said support bodies where said vertical strips are attached; and said support body cover comprising free ends and fastening means connected to said free ends, said fastening means being held in position by said pre-stress.

2. A deformable sealing device according to claim 1, wherein said face portion of said support body cover is directly contacting said block.

3. A deformable sealing device according to claim 1, wherein a deformation of said block that generates said pre-stress is approximately 1/50 to 3/50 of an expansion of said block in an undeformed state.

4. A deformable sealing device according to claim 1, wherein said fastening means are in the form of a reinforcement of said free ends and wherein a side of said block opposite said front faces of said support bodies is provided with a recess, with said fastening means being inserted into said recess.

5. A deformable sealing device according to claim 4, wherein said reinforcement is in the form of a ledge that is adhesively connected to said free ends of said support body cover.

6. A deformable sealing device according to claim 5, wherein said ledge is positioned in said recess in a non-tiltable manner.

7. A deformable sealing device according to claim 4, wherein said recess has a safety means for preventing said reinforcement from sliding out of said recess.

8. A deformable sealing device according to claim 1, further comprising a profiled support, fastening brackets attached to the building wall, and fastening latches with a U-shaped portion, with said profiled support, at vertical edges of a side thereof facing the vertical building wall poritons, having a respective groove into which said U-shaped portion of said respective fastening latches is inserted, with said fastening latches being connected to said brackets.

9. A deformable sealing device according to claim 8, wherein said profiled support, in a longitudinal direction thereof, is provided with at least one projection on a side facing said block, said projection being in a form-locking connection with said block to prevent sliding of said block.

10. A deformable sealing device according to claim 1, wherein said block has free ends provided with an elastically deformable protective coating.

11. A deformable sealing device according to claim 10, wherein said coating protects against ozone.

12. A deformable sealing device according to claim 11, wherein said protective coating protects against UV radiation.

13. A deformable sealing device according to claim 1, further comprising arms extending from the building wall and a transverse support supported at said arms, and wherein said transverse portion is supported at said transverse support with a length of said arms being adjustable against an elastic force.

14. A deformable sealing device according to claim 1, wherein a surface of said block facing said vertical strips of said skirt is in a frictional connection with a respective inner side of said support body cover and an outer side of said support body cover facing said vertical strips is in an adhesive connection with said vertical strips.

15. A deformable sealing device according to claim 1, wherein said support bodies have a square cross-sectional shape.

16. A deformable sealing device according to claim 1, wherein said support bodies have a rectangular cross-sectional shape.

17. A deformable sealing device according to claim 1, wherein said foamed material is plastic.

18. A deformable sealing device according to claim 1, wherein said foamed material is rubber.

* * * * *